United States Patent
Chamley

(10) Patent No.: US 9,483,641 B2
(45) Date of Patent: Nov. 1, 2016

(54) METHOD AND DEVICE FOR THE PERFORMANCE OF A FUNCTION BY A MICROCIRCUIT

(71) Applicant: OBERTHUR TECHNOLOGIES, Colombes (FR)

(72) Inventor: Olivier Chamley, Colombes (FR)

(73) Assignee: OBERTHUR TECHNOLOGIES, Colombes (FR)

( * ) Notice: Subject to any disclaimer, the term of this patent is extended or adjusted under 35 U.S.C. 154(b) by 0 days.

(21) Appl. No.: 14/509,144

(22) Filed: Oct. 8, 2014

(65) Prior Publication Data
US 2015/0101051 A1    Apr. 9, 2015

(30) Foreign Application Priority Data
Oct. 9, 2013    (FR) .................................... 13 59801

(51) Int. Cl.
*H04L 29/06*    (2006.01)
*G06F 21/55*    (2013.01)
*G06K 19/073*    (2006.01)

(52) U.S. Cl.
CPC ....... *G06F 21/554* (2013.01); *G06K 19/07363* (2013.01); *H04L 63/1441* (2013.01)

(58) Field of Classification Search
CPC .......... G06F 21/554; G06K 19/07363; H04L 63/1441
USPC .......................................................... 726/23
See application file for complete search history.

(56) References Cited

U.S. PATENT DOCUMENTS

| 8,555,390 B2 * | 10/2013 | Thiebeauld de la Crouee ............ G06K 19/07363 726/24 |
| 8,819,825 B2 * | 8/2014 | Keromytis ............ H04L 63/145 709/205 |
| 8,955,111 B2 * | 2/2015 | Glew ..................... G06F 21/552 726/22 |
| 9,009,829 B2 * | 4/2015 | Stolfo ................... G06F 21/554 726/23 |
| 2002/0046351 A1 * | 4/2002 | Takemori ................ G06F 21/55 726/23 |
| 2004/0260932 A1 | 12/2004 | Blangy et al. |
| 2010/0064370 A1 * | 3/2010 | Thiebeauld de la Crouee ............ G06K 19/07363 726/24 |
| 2010/0077225 A1 * | 3/2010 | Salgado ................... G06F 21/52 713/189 |

FOREIGN PATENT DOCUMENTS

| EP | 1 293 856 A1 | 3/2003 |
| FR | 2 935 823 A1 | 3/2010 |

OTHER PUBLICATIONS

FR Search Report, dated Apr. 4, 2014, from corresponding FR application.

\* cited by examiner

*Primary Examiner* — Michael S McNally
(74) *Attorney, Agent, or Firm* — Young & Thompson

(57) ABSTRACT

A method for the performance of a function by a microcircuit, includes:

at least one step of determining (205) whether an anomaly is detected or whether the operation of the microcircuit is normal;

when it is determined that an anomaly is detected, a step of performing (210) a protection function;

when it is determined that the operation of the microcircuit is normal, a step of performing (215) a decoy function simulating the protection function by being perceptible, from the outside of the microcircuit, in a manner more or less identical to the protection function;

the method being characterized in that it includes an interruption (250) of the performance of the decoy function by a timer.

18 Claims, 3 Drawing Sheets

METHOD AND DEVICE FOR THE PERFORMANCE OF A FUNCTION BY A MICROCIRCUIT

This patent application claims the priority of French patent application no. 1359801 of Oct. 9, 2013, which is incorporated by reference into the present application.

FIELD OF THE INVENTION

The invention relates to a method and a device for the performance of a function by a microcircuit. It applies, in particular, to the protection of microcircuit cards against attacks with analysis of power consumption.

CONTEXT OF THE INVENTION

In order to improve the security of the data and programs which microcircuit cards retain, protection measures currently used include steps of verification of the normal operation of the microcircuit, with the aim of detecting any anomalies, a possible origin of which is an attack.

In this respect, both the manufacturer and the developers of applications for these microcircuits implement attack detection mechanisms.

For example, the manufacturer may include detectors of abnormal conditions in the power supply (e.g. glitches) or light and the developers can implement countermeasures consisting, for example, in checking the integrity of the manipulated variables, or testing the redundancy of the information.

When an anomaly is detected, the card can perform a protection function consisting, for example, in writing a given value to a non-volatile memory area reserved for Killcard flag.

When certain conditions are fulfilled (for example when a certain number of anomalies have been detected), this protection function may have the effect of preventing any subsequent function of the card and/or removing the data stored in the microcircuit.

However, the operations of writing to a non-volatile memory consume much more power than operations to a RAM memory. The performance of a protection function is therefore easily detectable by an attacker, due to its particular power consumption signature.

When an attacker detects this particular signature, he can physically interfere with the microcircuit (e.g. by interfering with the clock frequency supplied to the microcircuit or by laser on an area of the microcircuit), or can prevent the performance of this protection function, for example by disconnecting the power supply of the microcircuit. The Killcard write operation protecting the data and programs of the microcircuit is then interrupted.

A countermeasure known from document FR2935823 consists in using a decoy function simulating the performance of the protection function and implemented when the microcircuit does not detect an attack.

However, the protection of the microcircuit by the performance of such decoy functions extends the processing time in normal operation, which is not desirable.

SUMMARY OF THE INVENTION

The object of the present invention is therefore to overcome at least one of these disadvantages.

In this context, a first aspect of the invention relates to a method for the performance of a function by a microcircuit, including:

at least one step of determining whether an anomaly is detected or whether the operation of the microcircuit is normal;

when it is determined that an anomaly is detected, a step of performing a protection function;

when it is determined that the operation of the microcircuit is normal, a step of performing a decoy function simulating the protection function by being perceptible, from the outside of the microcircuit, in a manner more or less identical to the protection function;

said method being characterized in that a timer interrupts the performance of the decoy function.

As a corollary, a second aspect of the invention relates to a device for the performance of a function by a microcircuit, including:

means for determining whether an anomaly is detected or whether the operation of the microcircuit is normal; and monitoring means, suitable:
when it is determined that an anomaly is detected, for performing a protection function;
when it is determined that the operation of the microcircuit is normal, for performing a decoy function simulating the protection function by being perceptible, from the outside of the microcircuit, in a manner more or less identical to the protection function;

said device being characterized in that the monitoring means use a timer in order to interrupt the performance of the decoy function.

Since the performance of the decoy function does not depend on the duration of performance of the protection function, it is then possible to reduce the calculation time of the decoy function while preserving its primary effect, i.e. to simulate the first moments of the performance of the protection function.

Even if no security anomaly is detected by the microcircuit, the decoy function simulates the start of the performance of the protection function in such a way that an attacker believes that he perceives the performance of the protection function and then interferes with the operation of the microcircuit.

The fact is thus exploited that, from the first moments of the performance, the signature of the decoy function is identical to that of the protection function, from the perspective of the attacker.

Furthermore, it is possible that the attacker, although detecting a signature characteristic of the protection function, chooses not to interfere with the performance of this function (which may in fact be the protection function or the decoy function). In this case, when his attack has been detected by the microcircuit, in reality he allows the protection function to be performed and, when his attack has not been detected and the operation of the circuit is considered as normal, the information received by the attacker will be incorrect since it is derived from the decoy function, the implementation duration of which is controlled independently from the protection function by the timer. In both cases, the protection of the microcircuit is improved.

Other characteristics of the method and device according to embodiments of the invention are described in the dependent claims.

In one particular embodiment of the invention, the step of determining the normal operation of the circuit includes a step of measuring at least one parameter from the following list: temperature, power supply voltage, mismatching (glitches), light, clock frequency.

In one particular embodiment of the invention, the step of determining the normal operation of the circuit includes a step of comparing the results of two performances, or a step of checking a relation between two calculation variables, or a step of checking a property of one variable.

The protection function is, for example, a function of disabling the microcircuit, such as a Killcard function consisting in writing a datum to a non-volatile memory area reserved for a Killcard flag as mentioned above.

Under certain conditions, the detection of this Killcard flag can, for example, cause the blocking of the operation of the card (via the shutdown of the program currently being executed and the prevention of a reinitialization of the card), or alternatively the immediate destruction of the data which it contains.

In one particular embodiment of the invention, the decoy function has a power consumption identical to that of the protection function; or the decoy function has an electromagnetic radiation more or less identical to that of the protection function.

Alternatively, a physical quantity perceptible from the outside of the microcircuit, modified by the protection function and the decoy function, may be an electromagnetic field, a resistance, a capacitance, an inductance, a voltage or a current.

In one particular embodiment of the invention, the protection function includes an access to a first area of a non-volatile memory, and the decoy function includes an access to a second area of this non-volatile memory, different from the first area.

This access may, for example, be a read or write access.

For this purpose, in one particular embodiment of the invention, the protection function includes a command to write a predetermined datum to the first area of the non-volatile memory. The decoy function may then include a command to write to the second area of the non-volatile memory.

Thus, in one particular embodiment of the invention, the timer interrupts the execution of the write command of the decoy function.

The calculation time necessary for the execution of the write command is thus reduced, the operation of the microcircuit thus being speeded up compared with the prior art where the write command is not interrupted during execution.

In one particular embodiment of the invention, the execution of the write commands of the protection function or of the decoy function implement an algorithm different from the commands to write to the non-volatile memory, carried out during the normal operation of the microcircuit.

In particular, the algorithm may differ in terms of software or hardware, the latter case applying when the memory areas concerned are of different types.

In one particular embodiment of the invention, at least one of the write commands does not involve any check datum. Notably no checksum is implemented.

In one particular embodiment of the invention, at least one of the write commands does not include the rereading of the written datum.

In one particular embodiment of the invention, at least one of the write commands does not include the erasure of the write area.

Each of these measures speeds up the writing of the non-volatile memory, thus reducing the risk of an action of the attacker to interfere with the microcircuit before the complete performance of the protection function, but without the signature of the different functions being different until the interruption of the performance of the decoy function.

Furthermore, the overall operation of the microcircuit is speeded up since the calculation time necessary for the implementation of the write commands without erasure of the write area, without checking and/or without rereading is reduced.

Finally, since the timer interrupts the performance of the decoy function before the end of its execution, and therefore during the performance of these elementary operations (generation, writing, rereading, etc.), the recovery of information on these elementary operations by the attacker is rendered more complex.

In one particular embodiment of the invention, the method furthermore includes a step of starting the timer, a step of expiry of the timer and a step of execution of a command to interrupt the performance of the decoy function.

Thus, the duration of the timer can be adjusted in such a way that the attacker perceives a sufficient part of the signature to be convinced of the current performance of a protection function.

The particular advantages, objects and characteristics of the device are similar to those of the aforementioned method.

In one particular embodiment, the different steps of the aforementioned method are determined by computer program instructions.

Consequently, the invention also relates to a computer program on an information medium, this program being capable of being implemented by a microprocessor, this program including instructions suitable for carrying out the steps of the method as mentioned above.

This program may use any programming language, and may be in the form of source code, object code or intermediate code between source code and object code, such as in a partially compiled form, or in any other desirable form.

The invention also relates to an information medium readable by a microprocessor, and including instructions of a computer program as mentioned above.

The information medium may be any entity or device capable of storing the program. For example, the medium may include a storage means, such as a ROM, for example a microcircuit ROM, or a magnetic recording means, for example a hard disk, or a flash memory.

Furthermore, the information medium may be a transmissible medium such as an electrical or optical signal which can be routed via an electrical or optical cable, by radio or by other means. The program according to the invention may, in particular, be downloaded from a storage platform of an Internet network.

Alternatively, the information medium may be an integrated circuit in which the program is incorporated, the circuit being suitable for performing or being used in the performance of the method concerned.

The aforementioned information medium and computer program have characteristics and advantages similar to the method which they carry out.

BRIEF DESCRIPTION OF THE FIGURES

Other aspects and advantages of the invention will become clear from the description below, illustrated by the attached figures which show embodiments devoid of any limiting character. In the figures.

DETAILED DESCRIPTION OF THE INVENTION

In the description that follows, the physical quantity perceptible from the outside of the microcircuit considered as a non-limiting example is power consumption, due to the fact that the attacks most frequently encountered today relate to this quantity.

However, the present invention is not limited to this type of modified physical quantity during the performance of a protection function or decoy function, but extends, on the contrary, to all modified physical quantities perceptible on the outside of a microcircuit, through contact with this microcircuit or with links connected to it or remotely.

Thus, a modified physical quantity to which the present invention relates may be an electromagnetic radiation or field, a resistance, a capacitance, an inductance, a voltage, a current or a power consumption, for example.

Generally speaking, during the normal operation of the microcircuit, a decoy function simulating a protection function performed when an anomaly is detected is carried out by modifying each predetermined physical quantity perceptible on the outside of the microcircuit in a manner more or less identical to the protection function.

The implementation or performance of this decoy function is interrupted in such a way as to reduce the corresponding calculation time. This interruption takes place in such a way that the attacker perceives a sufficient part of the signature of the decoy function to be convinced of the current performance of a protection function.

Figure 1:
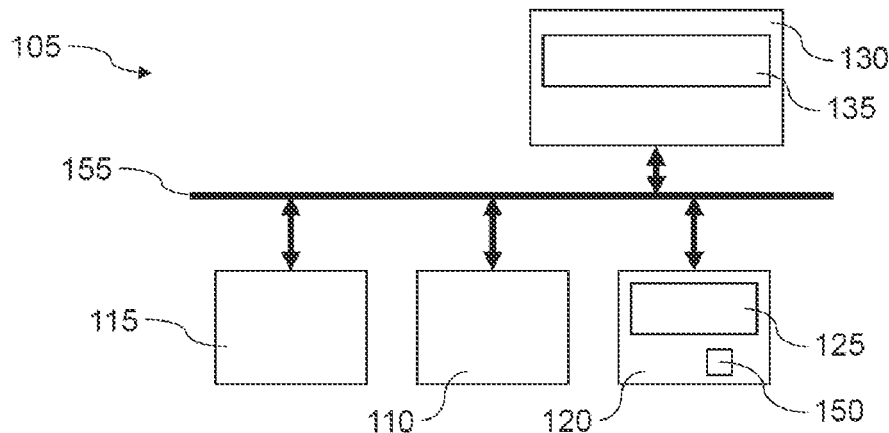
FIG. 1 shows schematically a device according to one particular embodiment of the invention.

FIG. 1 shows a microcircuit card 105 comprising the following elements interconnected via a bus 155:
microprocessor 110,
inputs/outputs 115,
a read-only memory 120 storing an operating system 125, and
a non-volatile memory 130 comprising a memory matrix 135 and directly controlled by the microprocessor 110.

Figure 5:
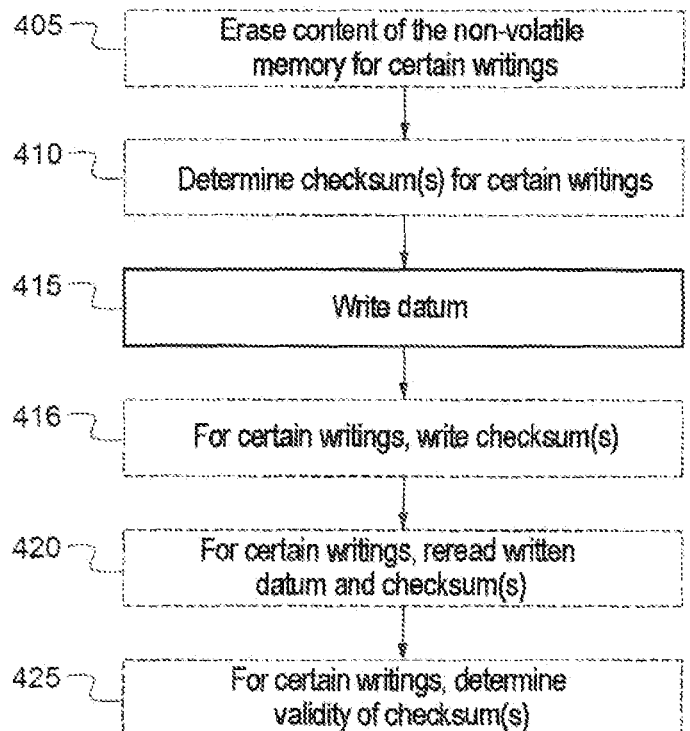
FIG. 5 shows, in the form of a flow diagram, a simplified algorithm for writing to the non-volatile memory which can be used by the protection and decoy functions.

A simplified write program 150 (or simplified write algorithm), the instructions of which are shown in FIG. 5 described below, is stored, for example, in the read-only memory 120 or in the non-volatile memory 130. Alternatively, the program 150 is directly implemented by the operating system 125 stored in the read-only memory 120. These memories can thus make up an information medium within the meaning of the invention.

The read-only memory 120 or the non-volatile memory 130 stores instructions of an operating program of the card 105. This program notably carries out the steps of the particular embodiment shown in FIG. 2.

In particular, during its operation, the microcircuit card determines (step 205) whether an anomaly is detected or whether the operation of the card is normal.

In practice, this step consists, for example, in verifying a checksum, i.e. in checking that the data recorded in the memory are indeed consistent with the checksum associated with these data. Alternatively, the determination may, for example, be based on the comparison of the results obtained by two implementations of the same algorithm.

If an anomaly is detected, a protection function, intended to protect the card and/or its contents, is performed (i.e. implemented).

And even if no anomaly is detected, i.e. if it is determined that the operation is normal, a decoy function simulating the protection function by being configured in such a way as to be perceptible, from the outside of said microcircuit, in a manner more or less identical to the protection function is implemented in part.

A timer controlled by the microprocessor 110 and the value of which is predetermined interrupts the implementation of the aforementioned decoy function before the full completion of its performance simulating the performance of the protection function.

In simple embodiments, the decoy function is configured in a manner identical to the protection function to within a parameter value or variable value.

Figure 2:
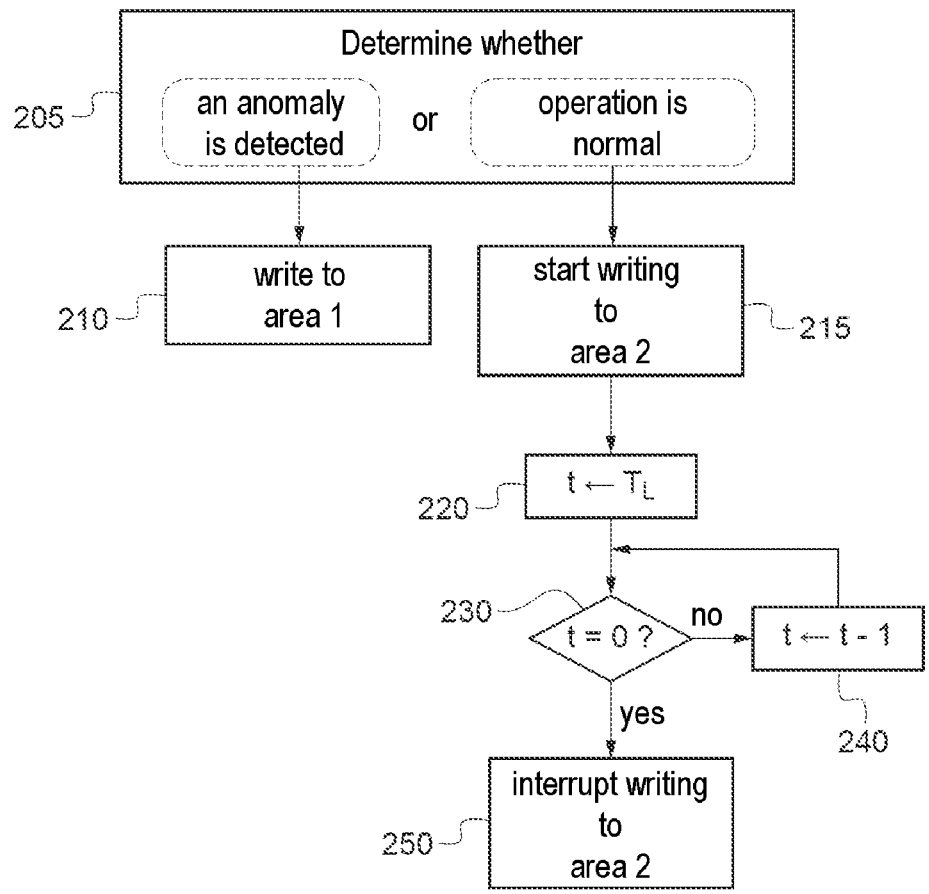
FIG. 2 shows, in the form of a flow diagram, the main steps of a method according to one particular embodiment of the invention.

As shown in FIG. 2, in one particular embodiment, the protection function consists, during a step 210, in writing a predetermined datum to a first area Z1 of the non-volatile memory.

This entails, for example, setting a Killcard flag to a predetermined value by writing a predetermined datum to a first area Z1 of the non-volatile memory 130 specifically dedicated to this flag. In other words, the presence of this predetermined datum in this first area Z1 is the result of the performance or implementation of this protection function.

Thus, the writing of such a datum in a memory area different from this first area Z1 dedicated to the flag is not taken into account by the card as invoking, for example, the blocking of the operation of the card (via the shutdown of the program currently being executed and the prevention of a reinitialization of the card), or alternatively the immediate destruction of the data which it contains.

In this embodiment, even if no anomaly is detected, i.e. if the operation of the circuit is determined as being normal, a step 215 of starting, here by the microprocessor, of the performance of a decoy function configured to have the same signature, in terms of power consumption, as the writing by the protection function of a predetermined datum to a first area Z1 of the non-volatile memory is carried out.

In one simple embodiment, the decoy function consists in writing a datum to a non-volatile memory 130, in a second area Z2, different from the first area Z1.

It must be remembered that this second area Z2 is not the area dedicated to the flag (first area Z1) and that the writing of a datum whatsoever in this area will not therefore be interpreted by the card as a Killcard flag value invoking, for example, the immediate destruction of the data which it contains or the blocking of the operation of the card, as is the case in the performance of the protection function.

Immediately after the start of the performance of the writing by the decoy function, a timer is started during a step 220. More precisely, this step consists in triggering a countdown with a duration $T_L$, at the end of which the timer expires. Thus, at the end of this step 220, the current time of the countdown $t=T_L$.

A test 230 indicates whether the countdown has expired, i.e. whether the current time of the countdown t=0.

If not, i.e. if t>0, the current time of the countdown t is, for example, decremented by one unit: t←t−1 during a step 240, then the method loops back to the test step 230.

If so, i.e. if t=0, this means that the countdown has expired, and the test step 230 is then followed by a step of interruption of the writing by the decoy function started in step 215.

In one variant of this particular embodiment, an example of a code (or series of instructions) which can be used to carry out a method according to a different embodiment of the invention is as follows:

EE_CONTROL=1; //preparation of the writing
If (Anomaly) *(char *) Z1=0x55; //when an anomaly is detected, the address indicated for writing of the datum 55 is the area 1
Else *(char *) Z2=0x55; // when the operation is normal, the address indicated for writing of the datum 55 is the area 2
TW=500; // initialization of the timer
TF=0; // initialization of a timer expiry flag
TR=1; // start of the timer (when the timer does not operate, TR=0)
EE_CONTROL=2; //start of the writing
While (!TF); //as long as the timer has not expired, the writing continues
If (Anomaly) While (EE_CONTROL=2); // on expiry of the timer, if an anomaly is detected, the writing continues
Else EE_CONTROL=0; // on expiry of the timer, if the operation is normal, the writing is interrupted In this example, the EE_CONTROL variable monitors the writing of a datum:
when this variable has the value 0, the microprocessor does not write;
when this variable has the value 1, the microprocessor is informed that a writing is about to start;
when this variable has the value 2, the microprocessor executes the writing.

Thus, in a non-limiting manner, the timer is initialized at TW=500 clock periods. Alternatively, the timer can be based on an element other than the clock.

A flag indicating the expiry of the timer is set to TF=0, thus indicating that the timer has not expired. This initialization is notably necessary in the case where the timer has expired during a preceding iteration (in this case TF=1). The initialization of TW and TF can be effected either in the order described here, or in reverse order.

Following the initialization of the expiry flag TF and the timer TW, the timer is started: TR=1 and, as long as the expiry flag does not have the value TF=0, the microprocessor executes the writing. On expiry of the timer, if an anomaly is detected, the writing continues, and, if not, the writing is interrupted.

It will be noted that, in contrast to what takes place in the prior art, the duration of performance of the decoy function does not depend directly on the duration of performance of the protection function, since the timer used is independent from the protection function. Thus, the performance of this decoy function can be shortened compared with the prior art, thereby saving calculation time and not excessively slowing down the operation of the microcircuit while providing its protection.

Figure 3:
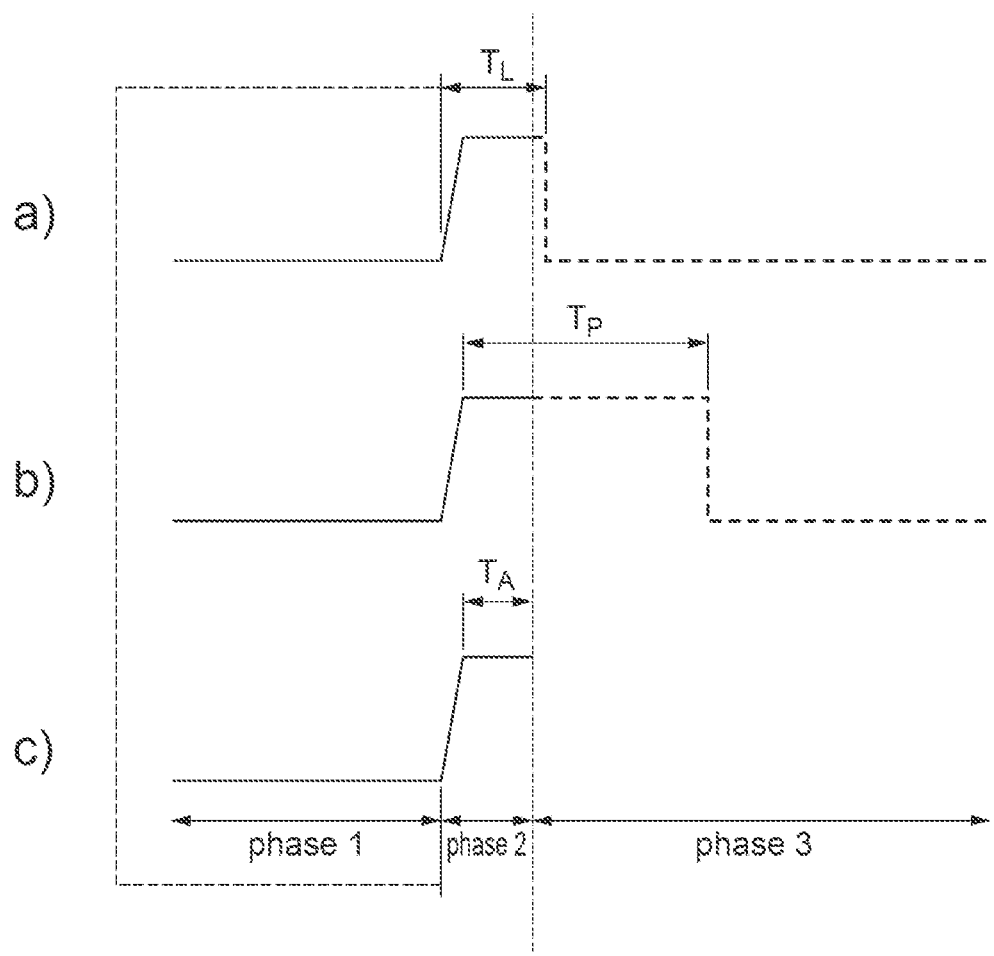
FIG. 3 shows schematically, in the form of timing charts, the performance of the protection function and the decoy function and the perception by the attacker of the performance of these functions.

With reference to FIG. 3, three timing charts show schematically the perceptible signatures in the performance of the decoy function (a) and the protection function (b) and the perception by the attacker (c) of the performance of these functions.

During a first phase (phase 1), the determination step 205 determines whether the operation of the microcircuit is normal (timing chart a) or if an anomaly is detected (timing chart b). This determination step 205 is transparent for the attacker (timing chart c), since it does not cause a priori writing to the non-volatile memory.

During a second phase (phase 2), according to the result of the determination step 205:
the implementation of a decoy function is started (timing chart a) and also the countdown as mentioned above, or
the implementation of a protection function is started (timing chart b).

As these two functions include a writing to the non-volatile memory, their signatures are perceptible in an equivalent manner by the attacker (timing chart c), who then decides, for example, to disconnect the power supply of the microcircuit at the end of the time $T_A$ (end of phase 2).

Phase 3 represents the continuation of the implementation of the functions in the case where the attacker does not disconnect the power supply of the circuit at the end of phase 2 (as shown in FIG. 3). In this case:
the decoy function implemented during phase 2 (timing chart a) is interrupted when the countdown $T_L$ has expired, or
the protection function implemented during phase 2 (timing chart b) is performed in a complete manner, and the Killcard flag is in fact written to the appropriate area.

As the attacker has not disconnected the power supply even though a high power consumption has been detected, he necessarily allows the protection function to be executed as soon as his attack has been detected.

Furthermore, the implementation of the decoy function being interrupted before its complete execution, the calculation time due to this execution is limited compared with the prior art.

$T_L$ is chosen in such a way that the first area Z1 is modified by a writing during $T_L$.

In practice, the duration of the timer $T_L$ may be fixed at around a quarter of the duration of the protection function $T_P$ in such a way that the electron migration effect for the writing takes place.

By way of example, the performance duration of the protection function $T_P$ is equal to the duration of a writing, i.e. around 1 ms to 2 ms. The time $T_A$ necessary for the detection of a writing is generally in the order of the microsecond.

According to the type of writing put into practice (conventional or simplified), the duration of the timer $T_L$ may thus be taken between 0.25 ms and 0.5 ms.

Returning to FIG. 2, in order that the signatures of the decoy and protection functions are the closest possible, the decoy function is configured to use the same write algorithm as the protection function.

For example, if the Killcard(Z1) function is used when it is determined that an anomaly is detected, the Killcard(Z2) function is implemented when there is no detection of an anomaly, i.e. the microcircuit operates normally.

A corresponding code, or series of instructions is as follows:

```
If anomaly detected {
Complete processing of the current APDU;
Killcard(Z1);
}
Else {
Complete processing of the current APDU
Killcard(Z2);
}
```

Figure 4:
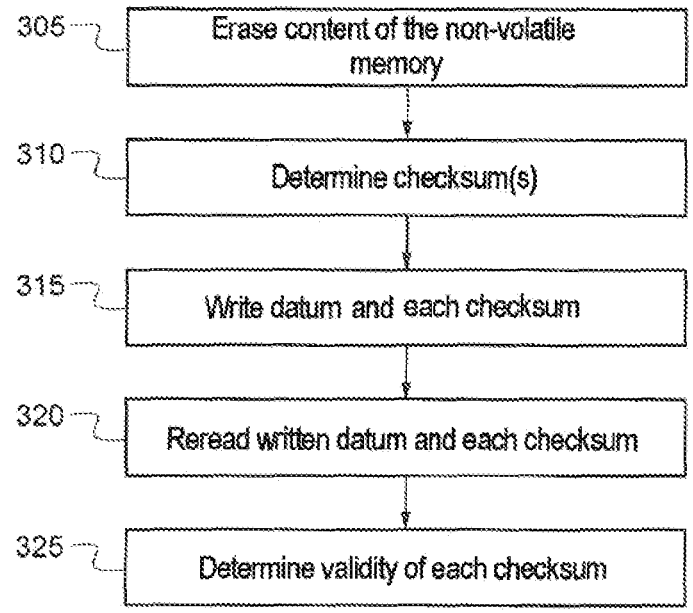
FIG. 4 shows, in the form of a flow diagram, a conventional algorithm for writing to the non-volatile memory which can be used by the protection and decoy functions.

In this context, FIG. 4 shows an example of a Killcard function which can be used by the protection and decoy functions. This function includes a write command made up of instructions corresponding to a conventional algorithm for writing a datum to the non-volatile memory.

An algorithm of this type comprises:
a step 305 of erasing the write area (here, according to the function implemented, the area 1 or the area 2),
a step 310 of determining at least one checksum from the datum that must be written,
a step 315 of writing the datum and each checksum determined during step 310,
a step 320 of rereading the written datum and each checksum, and
a step 325 of determining the validity of the checksums by repeating, on the read data, a determination of each corresponding checksum and by comparing it with the read checksum.

Thus, this conventional write algorithm is relatively long, which slows down the operation of the microcircuit.

It must be noted that the duration of a conventional write algorithm may last around 2 ms to 4 ms, around half of which is devoted to the erasure of the write area. The checking phase is relatively fast (a few tens of microseconds).

For the purpose of avoiding these disadvantages, it is possible to use a modified version of the Killcard function including instructions corresponding to a simplified write algorithm compared with the one shown in FIG. 4. An algorithm of this type has a reduced execution duration, for example 1 ms.

An example of a modified Killcard function of this type using a simplified write algorithm is shown in FIG. 5.

In practice, in order not to interfere with the execution of write commands in normal operation, the microprocessor of the card determines, prior to the execution of a write command, whether the command relates to one of the areas 1 or 2 of the non-volatile memory.

If not, this means that this write command does not relate to the protection function or the decoy function, and the conventional write algorithm shown in FIG. 4 is implemented.

If so, this means that this write command relates to the protection function or the decoy function and a simplified write algorithm, as shown in FIG. 5, is used.

This simplified write algorithm does not comprise:
the step of erasing the write area; this step is possibly maintained for certain randomly or cyclically chosen writings, during a step 405,
the step of determining at least one checksum; this step is possibly maintained for certain randomly or cyclically chosen writings, during a step 410,
the step of writing checksum(s); this step is possibly maintained during a step 416 for each checksum determined during a step 410,
the step of rereading the written datum; this step is possibly maintained during a step 420 for the data having resulted in determination of at least one checksum,
the step of determining the validity of the checksums by repeating, on the read data, a determination of each corresponding checksum; this step is possibly maintained during a step 425, for the data having resulted in determination of at least one checksum.

Thus, in one envisageable embodiment, the algorithm for writing to the non-volatile memory, used by the protection and decoy functions, comprises only:
the step 415 of writing the datum, and
only for certain randomly or cyclically chosen data writings, the step 405 of erasing the write area and/or the steps 410, 416, 420 and 425.

As an alternative to this embodiment in which the same write algorithm is used by the protection function and by the decoy function, the protection function, referred to as Killcard1(Z1), can use a different write algorithm from that used by the decoy function referred to, for example, as Killcard2 (Z2).

For example, the protection function can use the conventional write algorithm and the decoy function can use a simplified write algorithm, such as, for example, the one shown in FIG. 5.

Thus, in certain embodiments, the writing to the non-volatile memory by the protection function comprises the generation, writing, rereading and checking of checksum(s), whereas the writing to the non-volatile memory by the decoy function does not comprise them.

Alternatively, as explained above, only certain (cyclically or randomly selected) writings carried out by the decoy function comprise the generation, writing, rereading and checking of checksum(s).

In these last two cases, the wear and tear of the non-volatile memory is reduced, the normal operating speed of the microcircuit is increased, while rendering the recognition of the performance of the protection function by an external attacker more complex.

In any event, the duration of the performance of the decoy function does not depend on the duration of these elementary operations (generation, writing, rereading, etc.) since the timer interrupts the implementation of the decoy function before the end of the implementation of such operation(s).

This renders the recovery of information on the elementary operations by the attacker more complex.

It must be noted that the present invention can be implemented in the form of a program running in the microcircuit or in the form of a specialized integrated circuit, for example an ASIC (Application-Specific Integrated Circuit), a programmable logic circuit or logic integrated circuit which can be reprogrammed following its manufacture.

In these embodiments, a pocket or portable electronic entity comprises a microcircuit protection device which carries out the protection method which is the subject-matter of the present invention.

For example, this electronic entity is a PDA ("Personal Digital Assistant"), a USB stick, a memory card, a mobile telephone, an electronic passport or a microcircuit card (i.e. conforming to the ISO 7816 standard and protected, for example certified in accordance with common criteria).

The preceding examples are merely embodiments of the invention, which is not limited thereto.

The invention claimed is:

1. A method for the performance of a function by a microcircuit, the method comprising:
   determining whether an anomaly is detected or whether the operation of the microcircuit is normal;
   when it is determined that an anomaly is detected, performing a protection function;
   when it is determined that the operation of the microcircuit is normal, performing a decoy function simulating the protection function by being perceptible, from the outside of the microcircuit, in a manner identical to the protection function, the decoy function having a performance duration; and
   interrupting the performance of the decoy function by a timer prior to an end of the performance duration of the decoy function.

2. The method according to claim 1, wherein the decoy function has a power consumption approximately identical to that of the protection function, or the decoy function has an electromagnetic radiation approximately identical to that of the protection function.

3. The method according to claim 2, wherein the protection function includes access to a first area of a non-volatile memory, and
   the decoy function includes an access to a second area of the non-volatile memory different from the first area.

4. The method according to claim 1, wherein the protection function includes access to a first area of a non-volatile memory, and
   the decoy function includes an access to a second area of the non-volatile memory different from the first area.

5. The method according to claim 4, wherein the protection function includes a command to write a predetermined datum to the first area of the non-volatile memory.

6. The method according to claim 5, wherein the execution of the write commands of the protection function or the decoy function implements an algorithm differing from that of the commands to write to the non-volatile memory, carried out during the normal operation of the microcircuit.

7. The method according to claim 5, wherein at least one of the write commands does not entail the use of any check datum.

8. The method according to claim 5, wherein at least one of the write commands does not include the rereading of the written datum.

9. The method according to claim 5, wherein at least one of the write commands does not include the erasure of the write area.

10. The method according to claim 5, wherein the decoy function includes a command to write to the second area of the non-volatile memory.

11. The method according to claim 4, wherein the decoy function includes a command to write to the second area of the non-volatile memory.

12. The method according to claim 11, wherein the timer interrupts the execution of the write command of the decoy function.

13. The method according to claim 12, wherein the execution of the write commands of the protection function or the decoy function implements an algorithm differing from that of the commands to write to the non-volatile memory, carried out during the normal operation of the microcircuit.

14. The method according to claim 11, wherein the execution of the write commands of the protection function or the decoy function implements an algorithm differing from that of the commands to write to the non-volatile memory, carried out during the normal operation of the microcircuit.

15. The method according to claim 1, further comprising starting the timer,
    expiring the timer, and
    on expiry of the timer, executing a command to interrupt the performance of the decoy function.

16. The method according to claim 1, wherein the protection function is a function of disabling the microcircuit.

17. A non-transitory computer-readable medium including instructions to cause a microprocessor to execute a method comprising:
    determining whether an anomaly is detected or whether the operation of the microcircuit is normal;
    when it is determined that an anomaly is detected, performing a protection function;
    when it is determined that the operation of the microcircuit is normal, performing a decoy function simulating the protection function by being perceptible, from the outside of the microcircuit, in a manner identical to the protection function, the decoy function having a performance duration; and
    interrupting the performance of the decoy function by a timer prior to an end of the performance duration of the decoy function.

18. A device for the performance of a function by a microcircuit, the device comprising:
    means for determining whether an anomaly is detected or whether the operation of the microcircuit is normal; and
    a monitoring system configured to:
        when it is determined that an anomaly is detected, perform a protection function;
        when it is determined that the operation of the microcircuit is normal, perform a decoy function simulating the protection function by being perceptible, from the outside of the microcircuit, in a manner identical to the protection function, the decoy function having a performance duration; and
        use a timer in order to interrupt the performance of the decoy function prior to an end of the performance duration of the decoy function.

* * * * *